United States Patent [19]

Cheng

[11] Patent Number: 4,473,473

[45] Date of Patent: Sep. 25, 1984

[54] METHOD AND APPARATUS FOR DISTILLATION

[75] Inventor: Dah Yu Cheng, Los Altos Hills, Calif.

[73] Assignee: International Microporous Technology, Inc., Menlo Park, Calif.

[21] Appl. No.: 230,708

[22] Filed: Feb. 2, 1981

Related U.S. Application Data

[62] Division of Ser. No. 12,047, Feb. 14, 1979, Pat. No. 4,265,713.

[51] Int. Cl.³ .............................................. B01D 31/00
[52] U.S. Cl. ..................................... 210/490; 210/640; 210/500.2; 55/16; 203/10
[58] Field of Search ...................... 210/640, 490, 500.2; 55/16, 158; 203/10, 11; 159/DIG. 27, 47 R, 49

[56] References Cited

U.S. PATENT DOCUMENTS

| | | | |
|---|---|---|---|
| 2,972,586 | 2/1961 | Van der Neut et al. | 521/27 |
| 3,005,728 | 10/1961 | Bridgeford | 117/118 |
| 3,405,058 | 10/1968 | Miller | 210/640 |
| 3,556,305 | 1/1971 | Shorr | 210/490 |
| 3,580,841 | 5/1971 | Capotte et al. | 210/490 X |
| 3,615,024 | 10/1971 | Michaels | 210/490 |
| 3,950,249 | 4/1976 | Chiang et al. | 210/640 X |
| 4,067,805 | 1/1978 | Chiang et al. | 210/654 |
| 4,203,848 | 5/1980 | Grandine | 210/490 |
| 4,311,594 | 1/1982 | Perry | 210/640 |

Primary Examiner—Frank Spear
Attorney, Agent, or Firm—J. William Wigert, Jr.

[57] ABSTRACT

A composite membrane structure is used in a distillation apparatus and method. The composite membrane separates a distilland and a distillate, such as salt water and fresh water. The composite membrane comprises a thin lyophobic microporous layer or membrane and a thin lyophilic layer or membrane. Evaporation and condensation takes place within the micropores of the lyophobic membrane. The lyophilic layer prevents intrusion of distilland into the pores of the lyophobic layer.

32 Claims, 3 Drawing Figures

METHOD AND APPARATUS FOR DISTILLATION

This is a divisional of application Ser. No. 12,047, filed Feb. 14, 1979, now U.S. Pat. No. 4,265,713.

BACKGROUND OF THE INVENTION

The present invention relates to a method and apparatus for distillation and in particular, to one utilizing a composite membrane through which evaporation and condensation takes place.

Conventional distillation requires heating the distilland to the boiling point of one or more of the constituents of the distilland and then recovering and condensing the resulting vapor to a liquid, the distillate.

Distillation has also been accomplished through the use of a thin, porous, lyophobic membrane separating the distilland, typically an aqueous solution such as salt water, from the distillate, such as pure water.

The terms lyophobic and lyophilic are employed here to describe the wettability of a liquid on a solid surface. Lyophobic describes a non-wetting behavior of a liquid such that the contact angle between a liquid and a solid is greater than 90° so that the liquid tends to ball up and run off the surface easily. Lyophilic describes a wetting behavior of a liquid such that the contact angle between a liquid and a solid is less then 90° and the liquid spreads over the solid easily.

The contact angle or wettability depends on the relative attraction between the solid and liquid and between the molecules of the liquid themselves. If the attraction of the liquid for the solid is more than half that for itself, the contact angle is less than 90° and wetting is said to occur and the liquid is said to be lyophilic with respect to the solid. A liquid is lyophobic with respect to a solid when the attraction of the liquid for the solid is less than half that for itself thereby creating a contact angle greater than 90°.

When the liquid is water, the terms hydrophobic and hydrophilic are generally substituted for the more inclusive designations.

Due to the properties of the non-wetting lyophobic material at low pressures, liquid is prevented from entering within the pores of the lyophobic membrane. If the distilland has a higher equilibrium vapor pressure than the distillate, evaporation takes place at the hotter distilland side of the lyophobic pores and condensation occurs at the cooler, distillate liquid interface of the lyophobic membrane pores. Thus, in the case of the aqueous solution, in an effort to establish vapor pressure equilibrium, a net flux of water vapor thus passes through the pores of the hydrophobic membrane. One example of such thermal membrane distillation is described in U.S. Pat. No. 3,340,186.

This type of distillation process should be contrasted with reverse osmosis processes which also use porous membranes. Reverse osmosis does not involve an evaporation/condensation process. Thermal membrane distillation is an absolute filtration process where reverse osmosis is a relative filtration process.

Unfortunately, thermal distillation across a hydrophobic membrane has not been a practical approach for separating fresh water from salt water. This is due to a major problem called water-logging. Salt water migrates into the pores of the hydrophobic membrane and causes the fresh water and the salt water to make contact. In other words, the pores fill up with water thereby destroying the vapor barrier needed for the evaporation/condensation process.

The length of time it takes for water-logging to occur depends upon a number of variables. Typically, it only takes a few days for water-logging to occur and for the distillation process to stop completely. Although the membrane's vapor barrier can be re-established by draining the water from the cells and blowing the liquid out of the membrane pores with compressed air, having to do so every four to six days because of water-log greatly decreases the commercial applicability of thermal membrane distillation.

SUMMARY OF THE INVENTION

It is, therefore, an object of the invention to provide improved thermal membrane distillation.

Another object of the invention is to provide improved thermal membrane distillation utilizing a composite membrane composed of lyophobic and lyophilic layers.

Another object of the invention is to provide an improved thermal membrane distillation process which provides continuous distillate production over prolonged periods of time.

Another object of the invention is to provide a multiple-layered membrane for thermal membrane distillation which is not subject to liquid intrusion into the pores of the lyophobic layer with continuous use.

In accordance with the present invention, thermal membrane distillation is accomplished using a composite membrane separating the distilland from the distillate. The composite membrane comprises a thin microporous lyophobic layer and a thin lyophilic layer, with the lyophilic layer adjacent to the distilland and the lyophobic adjacent the distillate. In applications such as desalination of salt water, water-logging is prevented and continuous evaporation/condensation occurs within the pores of the hydrophobic layer.

The proper selection of pore sizes for both the lyophobic and lyophilic layers is important in maximizing the distillate production rate through the composite membrane for a given temperature and temperature difference. Generally, higher distillate production rates have been observed in composite membranes with the smaller pore sizes in the hydrophilic layer than in the hydrophobic layer, in the case of salt water distillation. Best results have occurred with the hydrophobic layer having a mean pore size of less than 0.5 $\mu$m diameter. The hydrophilic layer, desirably, should also have a mean pore size of less than 0.5 $\mu$m in diameter. It has also been found that the hydrophilic layer can be nonporous. Optimum pore sizes for systems designed for purposes other than water desalination may differ.

Examples of suitable porous hydrophobic materials for the composite membrane of the present invention include polytetrafluoro-ethylene (PTFE) such as DuPont's "Teflon" and polyvinylidene fluoride (PVF$_2$). Suitable hydrophilic materials include cellulose acetate, mixed esters of cellulose, and polysulfone. Other suitable porous hydrophobic and hydrophilic materials can also be used.

PTFE is the most hydrophobic polymeric membrane material known. PVF$_2$ is somewhat less hydrophobic, but has also been shown to perform well.

Cellulose acetate membranes and membranes of mixed esters of cellulose have water swelling properties, i.e., they expand when wetted with water or other solvents. It is thought that the pores, especially those of small diameter, may completely close on swelling and that the liquid transport through the membrane does not require pores but migrates through the molecular structure. Polysulfone membranes swell very little upon water wetting, therefore, their pore structure remains almost unchanged upon wetting.

Both the water-swelling hydrophilic membrane and the non water-swelling hydrophilic membrane in combination with a hydrophobic membrane prevent the water-logging phenomenon of prior art systems.

The composite porous membrane can be formed by clamping the hydrophobic/hydrophilic layers closely together to form a cell with a suitable support backing to maintain the integrity of the composite membrane. In accordance with another aspect of the invention, the composite membrane is formed by coating one of the layers on the other. For example, a hydrophobic membrane can be used as a substrate upon which a hydrophilic layer is formed.

In accordance with another aspect of the invention, a plurality of composite porous membranes are arranged in multiple stage cell configurations. A main advantage of multiple stage cell configurations is the conservation of heat energy. In a multiple stage cell, multiple composite membrane system, the heat rejected from one stage is used to provide the temperature gradient across another stage. The optimum number of stages is reached when the operating temperature of any additional stages is so low that the distillate production rate is uneconomically low.

DESCRIPTION OF THE PREFERRED EMBODIMENT

Figure 1:
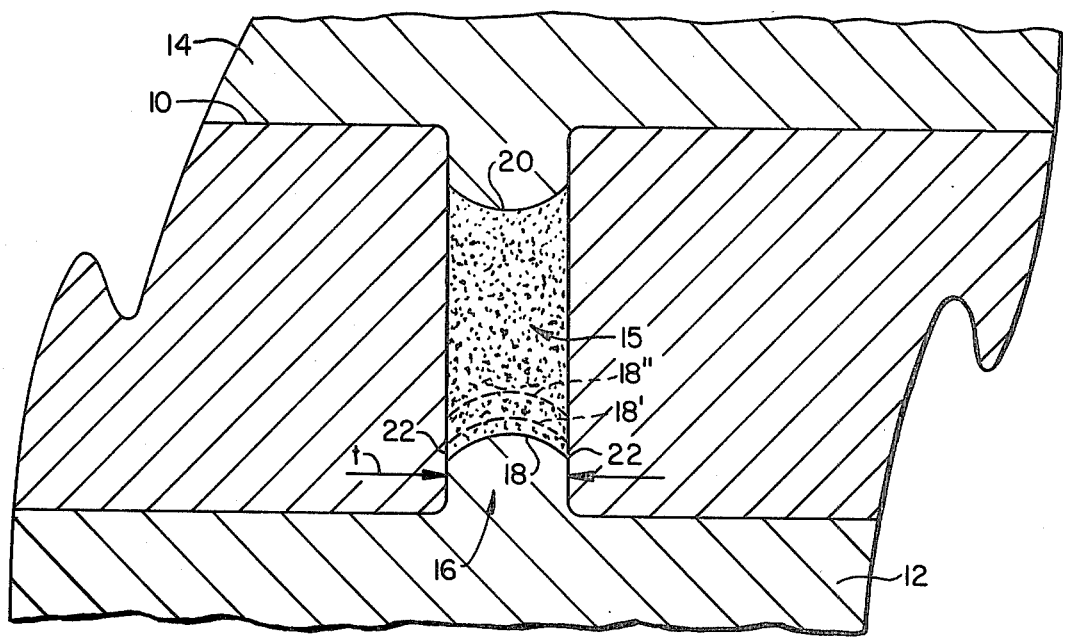
FIG. 1 is an enlarged sectional view of a conventional, single-layer, hydrophobic porous membrane distillation device.

FIG. 1 is a sectional enlargement of a single hydrophobic membrane 10 separating a distilland 12 such as salt water, and a distillate 14 which is fresh water. A pore 16 extends across the hydrophobic membrane 10. Initially, due to the hydrophobic nature of the membrane 10, neither the salt water 12 nor fresh water 14 penetrates within the gaseous region 15 of pore 16. Two convex-shaped liquid-vapor surfaces 18 and 20 are defined at each end of pore 16.

Nonequal equilibrium states exist at the two interfaces 18 and 20 if the distilland 12 has a higher vapor pressure than the distillate 14. As previously explained, pure water evaporates into the capillary pore 16 and the vapor is condensed at the vapor/liquid interface 20 on the distillate side 14 in an effort to establish local vapor pressure equilibrium. The result is the creation of a net flux of water vapor across the pore 16.

In distillation apparatus using the single hydrophobic membrane 10 of FIG. 1, after several days the vapor barrier across the pores is destroyed and hence the distillation process through the membrane, ceases. This is due to water-logging. The distilland liquid-vapor interface 18 migrates in a direction toward the distillate side 14, as indicated by 18' and 18", until eventually it intersects the liquid-vapor interface 20 on the distillate side of the membrane 10. This destroys the gaseous barrier needed for the distillation process to occur.

It is believed that the reason that water-logging occurs is due to the effect of the dissolved salt in the distilland 12. The saline solution changes the hydrophobic property of the membrane 10. More particularly, it is believed that the saline solution changes the hydrophobic property of the membrane 10 where the liquid-vapor interface 18 contacts the side wall 22 of the pore 16. As a result, the salt water, rather than being prevented from filling the pore, is able to migrate within the pore, eventually completely filling in with liquid.

A possible explanation for the alteration of the normally hydrophobic property of membrane 10 follows.

During distillation, for a given pressure, evaporation takes place at approximately a constant temperature. Addition of heat increases the kinetic energy of some liquid molecules enough to overcome the evaporation energy barrier. This heat is commonly known as the latent heat of evaporation. The latent heat of evaporation is a result of molecular attraction of the molecules which are tightly packed in the liquid phase. There is an energy barrier at the interface between the vapor and the liquid created by an unbalanced attracting surface force for vapor molecules onto the interface surface. The very short mean free path (average molecular distance) on the liquid side compared with the vapor side creates the unbalanced forces at the interface. This is the phenomenon which creates surface tension.

It is possible to change the evaporation (or condensation) energy barrier by changing the surface curvature at the liquid-vapor interface thereby requiring less kinetic energy by water molecules to escape from the liquid into the vapor. For a convex liquid surface, the greater the convexity, the greater the evaporation rate for a given temperature. Further, a convex liquid surface will have a greater rate of evaporation than a concave liquid surface. Conversely, the rate of condensation is less on a convex liquid surface than on a concave liquid surface.

The effect of the degree of curvature on evaporation rates can be seen in the formation of water droplets at a given temperature. Small drops, having greater curvatures, require higher vapor partial pressure to reach equilibrium with the surrounding gas mixture. As an example, the distribution of different drop sizes existing in a cloud formation or cloud chamber will shift to larger drop sizes with time. The bulk temperature and vapor pressure is the same for all sizes of droplets. Due to the required higher equilibrium vapor partial pressure for small drops, they will evaporate to increase the bulk vapor pressure of the surrounding gas mixture. This, however, causes a condensation to take place on the larger drops since their equilibrium vapor partial pressure is lower, due to their "flatter" outside curvature.

For a period of time the smaller sized drops disappear and the large sized drops become larger. In a rain cloud, as the size of a drop increases, the gravitational force becomes larger than the air current buoyancy forces and rainfall begins.

In an analogous manner, it is believed that the dissolved salt in the distilland 12 can alter the curvature of the liquid-vapor interface 18, thereby altering the evaporation energy barrier. Exactly what the nature of the modification is, is uncertain. But that it does appear to take place is suggested by another well known phenomenon, that of a drying salt water puddle.

In the drying process crystals or solids periodically precipitate at the perimeter to form concentric drying rings around the edge of the puddle. Usually the center of a drying puddle has a lower solids concentration than at the edge. A close examination of the edge of a puddle indicates that the curvature of the liquid surface at the edge of the puddle containing dissolved salts is considerably modified from a pure water puddle surface contacting edge. The evaporation energy barrier and the salt concentration distribution at the edge of the liquid puddle are also considerably changed from those of the homogeneous solution.

Since the surface tension is a function of the salt concentration, the salt concentration in turn modifies the surface curvature. For example, increasing sodium chloride content increases the surface tension of water. The increased surface tension due to increased curvature at the edge creates two effects. First, it increases the rate of evaporation of water at the edge of the puddle. Secondly, it produces a higher salt concentration at the edge while the center is left with the lower concentration of the homogeneous solution. The evaporation of the puddle increases the burden of the surface tension as it attempts to hold to the original boundary. Eventually, the original boundary cannot maintain its position and recesses to a new equilibrium position. When the boundary recesses, the salt precipitates at the boundary leaving behind a salt ring. The process repeats itself, forming multiple rings until the water is completely dried.

An analogous situation may be responsible for water-logging in the hydrophobic membrane pores. Salt concentration increases at the edge of the liquid-vapor interface 18 adjacent the pore wall 22 due to local surface tension alterations caused by the effects of the hydrophobic material on the salt water. This condition modifies the surface tension there, which in turn modifies the liquid-vapor interface curvature and increases the rate of evaporation of water and causes salt precipitation to occur along the edge 22 of the liquid-vapor interface rendering the hydrophobic wall of the membrane hydrophilic. The original boundary is therefore not maintained, and the liquid-vapor interface 18 migrates to position 18'. Eventually, migration causes the salt water interface to collide with the fresh water interface, and water-logging occurs.

Figure 2:
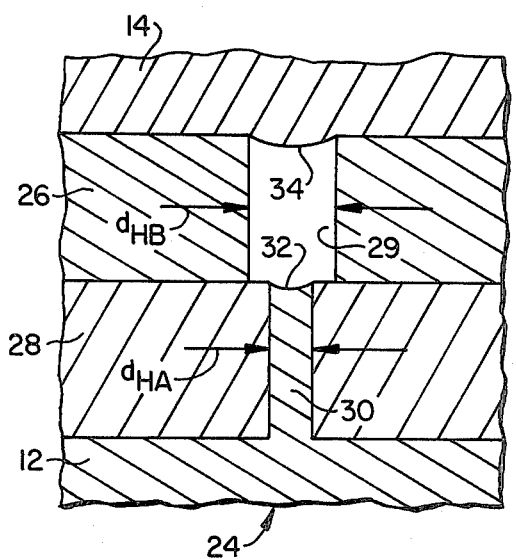
FIG. 2 is an enlarged sectional view of a composite hydrophilic/hydrophobic membrane in accordance with the present invention.

FIG. 2 is an enlarged sectional view of a composite porous membrane 24 for thermal membrane distillation, in accordance with the present invention. The composite membrane 24 comprises a hydrophobic layer 26 to which is closely joined a hydrophilic layer 28. The membranes must be pressed together closely enough to alter the surface tension effect at the salt water/water vapor interface and, therefore, prevent salt precipitation at the edge as will be explained subsequently. The hydrophilic layer 28 is adjacent the distilland 12 and the hydrophobic layer is adjacent the distillate 14. In the embodiment described, the distilland is salt water and the distillate is fresh water.

As with the single hydrophobic distillation membrane 10 of FIG. 1, evaporation and condensation take place within micropores 29. The hydrophilic layer 28 can also be micro-porous, but, because of the affinity of water to the hydrophilic material of layer 28, the pores 30 of the hydrophilic layer 28 fill by capillary action with salt water. With a vapor pressure gradient across the composite membrane 24 a net evaporation takes place at the salt water/vapor interface 32 and a net condensation occurs at the fresh water/vapor interface 34. However, unlike the case of the single hydrophobic distillation membrane, water-logging does not occur within the composite membrane 24. It has been found, as explained previously, that the hydrophilic layer need not be porous. Nor is there a requirement that where the hydrophilic layer is porous, that the pores be aligned with the hydrophobic pores, as shown in FIG. 2.

The vapor transport rate across the pores 29 is dependent on the vapor pressure gradient across the pore cavity, i.e., on the vapor pressure difference at the evaporating liquid/vapor interface 32 and the condensing vapor/liquid interface 34. The vapor pressure is a function of the temperature, salt concentration, and surface curvature. Therefore, all three properties must be considered in creating the desired vapor pressure gradient across the composite membrane 24.

The reason that the composite hydrophilic/hydrophobic membrane does not exhibit water-logging is not known for certain. However, it is believed that the hydrophilic layer adjacent the hydrophobic layer alters the liquid/vapor interface 32 in such a way that salt water 12 does not intrude within the pores 28. The hydrophilic layer 28 may interact with the hydrophobic layer 26 to change the surface curvature of the liquid/vapor interface so that the salt concentration does not increase at the edge of the pore. Both the hydrophilic and hydrophobic layers are needed to accomplish continuous water distillation by a thermal membrane distillation process and to overcome the water log problem.

The proper selection of pore sizes for both the hydrophobic and hydrophilic layers of the composite membrane is important for maximizing distillate production and insuring uninterrupted flow. The pore sizes of the hydrophobic layer should be chosen to withstand at least the hydraulic pressure exerted by the liquids on either side of the membrane. That is, the bubble pressure across the hydrophobic layer must exceed, at a minimum, the absolute hydraulic pressure. The vapor pressure in the pore may be much lower than atmospheric pressure, therefore the bubble pressure must exceed the absolute hydraulic pressure rather than simply the gauge hydraulic pressure.

Bubble pressure is defined as the required pressure to overcome the capillary surface tension. This is directly related to pore diameter. Since the porous hydrophobic material has a distribution of pore diameters, the maximum absolute pressure on either side of the hydrophobic membrane must not exceed the bubble pressure for the largest pores. Because capillary forces are greater for smaller pores, bubble pressure increases as pore size decreases.

Best results have been obtained with mean pore size for the hydrophobic layer of less than 0.5 $\mu$m for PTFE for desalination of salt water. Preferably, the mean pore size of the hydrophilic layer 28 is smaller than the mean pore size of the hydrophobic layer 26. Generally, best results have been obtained with mean pore size less than 0.5 $\mu$m for the hydrophilic layer as well. The important objective of selecting the hydrophilic layer pore size is to alter the liquid-gas interface 32 at the pores 29 of the hydrophobic layer to prevent migration of the distilland into the hydrophobic pores to prevent water-logging. It has also been found that non-porous hydrophilic materials can also be used in the composite membranes of the present invention.

The composite membrane should be made as thin as possible so that the vapor transport distance across the membrane is as short as possible. A practical limitation on thinness is that it must be sufficiently strong that it doesn't tear or rupture. Typical thicknesses for the hydrophobic layer are about 1.5 mils for PTFE and about 2 to 6 mils for $PVF_2$.

Composite hydrophilic/hydrophobic membranes were tested using a PTFE hydrophobic membrane (Millipore "Fluoropore" filter—type FG) with a mean pore diameter of 0.2 $\mu$m. Composite hydrophilic/hydrophobic membranes were tested with hydrophilic mean pore sizes of 0.2 $\mu$m, 0.1 $\mu$m, 0.05 $\mu$m, and 0.025 $\mu$m (Millipore "MF" filter, types GS, VC, VM, and VS, respectively, which are made of a mixture of cellulose acetate and cellulose nitrate).

The large mean pore diameters of 0.2 $\mu$m and 0.1 $\mu$m used for the hydrophilic layer used in the composite membrane system did not significantly differ in performance, but the composite membranes with the 0.05 $\mu$m and 0.025 $\mu$m hydrophilic mean pore sizes did show the positive influence of selective pore size diameter.

Experiments were performed to test and compare the performance of a single 0.2 $\mu$m mean pore size PTFE hydrophobic membrane with a composite membrane comprising a cellulose-acetate/cellulose-nitrate hydrophilic membrane, also with a mean pore size of 0.2 $\mu$m, laminated with a PTFE membrane with an identical mean pore size. The salt content used in the water in these experiments was at least 30 grams in 1000 grams of water. Tests were conducted with the salt water heated to both 160° F. and 130° F. for comparison.

The results show that the single hydrophobic membrane has a rapid distillate production rate drop off in the 160° F. case and stopped completely in 4 days. At the lower temperature of 130° F., the flow through the single membrane stopped in 2 days. In contrast, the composite membranes ran for 20 days and still showed no signs of stopping, at which time the experiment was discontinued.

The composite membrane of the present invention functions effectively even at very low temperatures as long as the vapor pressure gradient exists from the distilland to the distillate. The concentration of dissolved salts in the distilland increases with time as evaporation/condensation takes place which eventually causes the precipitation of salts, unless some high salt concentration distilland is drained off and replaced with less concentrated distilland. If the composite membrane causes the salt to concentrate in the center of the liquid/vapor interface 32, or at least not cause salt to precipitate at the edge of the liquid-solid interface, then the salt concentration, although high at the interface, can still be diffused back into the bulk distilland solution rather than precipitate at the interface and cause waterlogging.

Most of the trapped gas in the hydrophobic pores may be absorbed by the condensate water, especially at low temperature operation. This creates a partial vacuum such that the equilibrium at the liquid-vapor interface 32 is changed. The partial vacuum increases the vapor diffusion rate but also reduces the condensation rate at the liquid/vapor interface 34 at the distillate side.

One of the essential elements in water desalination is the best utilization of available energy. The cell in a composite thermal osmosis membrane system can be operated at atmospheric or higher water pressures at temperatures as low as 120° F. Consequently, many sources of waste heat from industrial plants and also from home uses, for example, may be used as energy for creating the necessary temperature differential for thermal distillation to occur across the composite membrane.

In any distillation process, enough energy must be supplied to overcome the latent heat of evaporation, which for water is about 900 Btu/lb. However, some of the heat used for evaporation of the water on the distilland side of the composite membrane can be recovered upon condensation of the distillate. In a thermal membrane distillation system, the temperature drop from the saline water side to the fresh water side desirably exceeds about 2° F.

Figure 3:
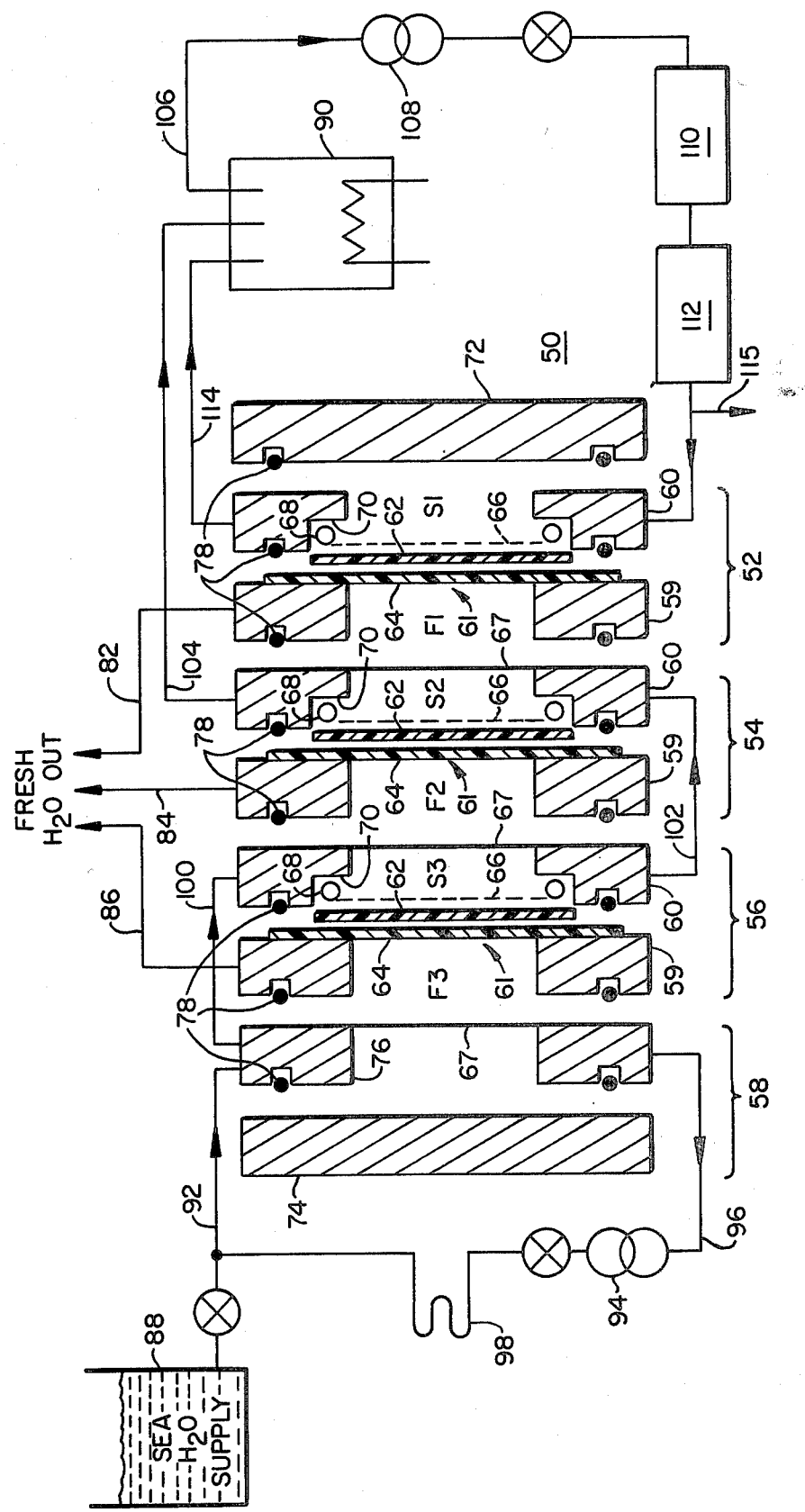
FIG. 3 is an exploded sectional view of a multiple-stage-cell, multiple composite membrane distillation system, in accordance with the present invention.

FIG. 3 is an exploded, sectional view of a multiple stage cell desalination system 50 with three cell stages 52, 54 and 56. Additionally, there is a pre-heat cell stage 58. Each cell stage, 52, 54, and 56 includes two ring members 59 and 60, which sandwich and support a composite membrane 61 comprising a hydrophilic membrane 62, a hydrophobic membrane 64, and a support screen 66. Individual cell stages are separated by stainless steel plates 67 which pass waste heat to the adjacent, lower temperature cell stages.

Support screen 66 is made of a material, such as stainless steel, which is chemically inert to salt water. It is necessary to support the thin composite membrane 61 to be able to hold the hydrophobic membrane against the hydrophilic membrane and also to prevent rupturing. The screen is attached along its periphery by a stainless steel loop 68 which fits into a recess 70 of ring member 60.

An end cap 72 completes one end of the multiple stage cell system 50. Another end cap 74 seals the other end by engagement with another ring member 76. End cap 74, ring member 76, and stainless steel plate 67 define the pre-heat cell stage 58. O-rings 78 are provided to maintain the integrity of the pre-heat cell 58, as well as the membrane cell stages 52, 54 and 56. The cell stages 52, 54 and 56 as well as the pre-heat cell 58, and end plates 72 and 74 are clamped together by suitable means, not shown for clarity.

For sake of clarity, the fresh and salt water sides of each of the cell stages 52, 54 and 56 are designated with the letters "F" and "S", respectively. Thus, cell stage 52 has a fresh water side F1 and a salt water side S1, cell stage 54 has sides F2 and S2, and cell stage 56 has sides F3 and S3. Conduits 82, 84 and 86 are provided from the fresh water side of cell stages 52, 54 and 56, respectively, for recovering the condensed distilled water.

A source of salt water to be desalinated is shown at 88. It should be understood that while salt water is the distilland in this particular embodiment, any aqueous solution containing dissolved minerals or particles can be distilled using the multiple-stage-cell apparatus 50. This includes, for example, muddy water, sewage, and aqueous solutions of industrial wastes.

A heat source is provided at 90. Desirably, waste heat is used, but a heater can be used if waste heat is not available. In the multiple-stage-cell system 50, each successive cell stage is cooler than the preceeding cell stage, with cell stage 52 being the hottest. The remaining distillation cell stages 54 and 56, and pre-heat cell stage 58 are each successively cooler. Of course, for each composite membrane 61 within each cell stage, there is a temperature difference maintained across it.

The flow of salt water being distilled will now be explained. Salt water enters the pre-heat cell 58 through conduit 92. The salt water is elevated in temperature by heat transmitted through stainless steel plate 67 from the fresh water side F3 of cell stage 56.

Some of the salt water passing through pre-heat cell stage 58 is passed by pump 94 through an outlet conduit 96, through a heat exchanger 98 where waste heat is dispelled, to maintain the end of the system 50 as cool as possible. The remainder of the salt water passes out of pre-heat cell stage 58 through conduit 100 to the salt water side S3 of distillation cell stage 56. Additional salt water is added to pre-heat cell stage 58 as required.

Salt water entering the S3 side of cell stage 56 is heated by the fresh water side F2 of cell stage 54 through stainless steel plate 67. Desalinated fresh water passes out from the fresh water side F3 of cell stage 56 through conduit 86.

Partially distilled salt water from the S3 side passes through conduit 102 to side S2 of cell stage 54, where it is further heated by the fresh water side F1 of cell stage 52 through stainless steel plate 67. Distilled fresh water passes out of F2 through conduit 84 after passing through the composite membrane.

The partially distilled salt water, now having a higher salinity content, then passes out of side S2 of cell stage 54 through conduit 104 to heat source 90. There it is further heated and is pumped to the salt water side S1 of cell stage 52 through conduit 106 by pump 108. Salt water flowing to cell stage 52 passes through a filter 110 and a flow meter 112.

Distilled water from side F1 of cell stage 52 flows out of the cell through conduit 82. Remaining salt water from side S1 passes out of conduit 114 where it is reheated and mixed with salt water from S2. Some highly concentrated salt water is drained at conduit 115 to maintain the salt concentration at a desired level. Of course, salt water can be drained at any cell stage to adjust the salt concentration as desired.

It can be seen that each cell stage is "driven" by heat from the preceeding cell stage. Additionally, since the fresh water sides F1-F3 give off heat to the salt water side, the vapor pressure of the fresh water side is maintained below the vapor pressure of the salt water side of that cell stage by maintaining a sufficient temperature difference. Thus, a vapor pressure gradient is established aross each of the composite membranes 61 which is required for distillation to take place.

In an actual embodiment each of the ring members 59 and 60 and the end plates 72 and 74 are made of a polycarbonate plastic. Of course, of primary importance in the selection of this material, is the ability to withstand the corrosive effects of warm salt water solutions.

The hydrophilic membranes 62 in distillation system 50 are made typically of cellulose acetate/cellulose nitrate mixture such as type No. MF-VM made by Millipore. The mean pore diameter for this membrane is 0.05 μm. The hydrophobic membranes 64 are PTFE, such as Millipore's "Fluoropore" filter, Type FG, which has a mean pore diameter of 0.2 μm.

Once the system reached a steady state condition, the output of pure water from distillation system 50 was 10 pounds of water per square foot of composite membrane 61 per day for cell stage 56; 12 pounds for cell stage 54; and 7 pounds for cell stage 52. Salt water was drained at 6.6 pounds of water per square foot per day of membrane area.

Representative temperatures within each cell stage are:
Preheat: 75° F.
F3: 95° F.
S3: 115° F.
F2: 126° F.
S2: 144° F.
F1: 158° F.
S1: 171° F.

To clamp the hydrophobic membrane 64 against the hydrophilic membrane 62 and also to protect against contamination in the event of rupture of a composite membrane 61, the fresh water sides F1-F3 are maintained at a higher pressure than the respective salt water sides S1-S3 of each of the cell stages.

It is preferable in case of the multiple stage cell configuration of FIG. 3 to have higher concentration saline solutions in the higher temperature cells. It was found that higher temperatures are required to maintain acceptable distillate production rates from the more concentrated distilland solutions. This is determined by the thermodynamic states of the solution. In general, it is preferred to arrange brine feed so that the salt concentration increases with cell temperature. Thus, the salt concentration is greatest at S1 and lowest in S3.

In multiple stage cell systems, the energy used for fresh water production is reduced approximately as the inverse of the number of cells. For example, a three-stage cell system uses about one-third of the energy required to produce fresh water in a single-stage cell system. Typically, in a multiple stage cell system with salt water temperature of 180° F. in the hottest cell, the required energy to produce pure water will be as low as 180 Btu/lb. which is one-fifth the energy necessary to evaporate water.

Commercial stills also use multiple stage evaporation techniques, but limiting consideration for the optimum number of conventional evaporation stages is the pressure difference between evaporator stages, the pressure difference becoming smaller with the addition of stages. On the other hand, with the multiple-stage composite membrane cell system, such as shown in FIG. 3, the limiting consideration is the temperature difference across the cell stages.

When brine attains a sufficient concentration, it has a commercial value as feedstocks to other process industries. High concentration saline solutions may be taken out of the system and reused. Salt brine concentrations as high as 25% have been achieved utilizing the composite membrane cells of the present invention.

What is claimed is:

1. A composite membrane for applications where unidirectional passage of water vapor is required comprising a layer of porous, nonwettable, hydrophobic polyvinylidene fluoride through which water is prevented from passing in the form of a liquid but passes in the form of a vapor and barrier means for preventing any liquids, including salt-bearing liquids, from intruding within the pores of said polyvinylidene fluoride layer while allowing passage of water vapor through the pores of said polyvinylidene fluoride layer, comprising a hydrophilic layer substantially on the surface of the polyvinylidene fluoride layer.

2. A composite membrane as in claim 1 wherein the mean pore diameter of the hydrophobic layer is less than 0.5 μm.

3. A composite membrane as in claim 2 wherein the mean pore diameter of the hydrophilic layer is less than 0.5 μm.

4. A composite membrane as in claim 1 wherein said hydrophilic layer is porous.

5. A composite membrane as in claim 4 wherein the average pore size of the hydrophilic layer is less than the average pore size of the hydrophobic layer.

6. A composite membrane as in claim 4 wherein the hydrophilic layer is a mixture of cellulose acetate and cellulose nitrate.

7. A composite membrane as in claim 4 wherein the hydrophilic layer is cellulose acetate.

8. A composite membrane as in claim 4 wherein the hydrophilic layer is polysulfone.

9. A composite membrane as in claim 1 wherein said hydrophilic material is non-porous.

10. A composite membrane for applications where unidirectional passage of water vapor is required comprising a layer of porous, hydrophobic, fluoropolymer plastic through which aqueous solutions are prevented from passing but through which water can pass in the form of a vapor and means for preventing an aqueous solution from intruding within the pores of said fluoropolymer plastic while allowing passage of water vapor through the pores comprising a layer of hydrophilic material substantially on the surface of the fluoropolymer layer.

11. A composite membrane for applications where unidirectional passage of water vapor is required comprising a layer of porous, nonwettable to aqueous solutions, hydrophobic, fluoropolymer through which water can pass only in the form of a vapor and means for preventing an aqueous solution from intruding within the pores of said fluoropolymer while allowing passage of water vapor through the pores comprising a layer of hydrophilic material substantially on the surface of the hydrophobic layer.

12. A composite membrane as in claim 11, wherein said hydrophilic layer is porous.

13. A composite membrane as in claim 12 wherein the average pore size of the hydrophilic layer is less than the average pore size of the hydrophobic layer.

14. A composite membrane as in claim 12 wherein the hydrophilic layer is a mixture of cellulose acetate and cellulose nitrate.

15. A composite membrane as in claim 12 wherein the hydrophilic layer is cellulose acetate.

16. A composite membrane as in claim 12 wherein the hydrophilic layer is polysulfone.

17. A composite membrane as in claim 11 wherein the mean pore diameter of the hydrophobic layer is less than 0.5 $\mu$m.

18. A composite membrane as in claim 11 wherein the mean pore diameter of the hydrophobic layer is within a range of about 0.025 $\mu$m. to 0.5 $\mu$m.

19. A composite membrane as in claim 11 wherein the hydrophobic layer comprises substantially polytetrafluoro-ethylene.

20. A composite membrane as in claim 11 wherein said hydrophobic layer comprises substantially polyvinylidene fluoride.

21. A composite membrane as in claim 20 wherein said hydrophilic layer is nonporous.

22. A layered membrane suitable for use in applications where unidirectional passage of water vapor is desired therethrough comprising:
a microporous hydrophobic layer through which water can pass in the form of a vapor but is prevented from passing in the form of a liquid; and
means for preventing liquids, including salt-bearing liquids, from intruding within the pores of said microporous hydrophobic layer while allowing passage of water vapor through the pores of said hydrophobic layer, comprising a hydrophilic layer on substantially the surface of said microporous hydrophobic layer.

23. A layered membrane as in claim 22 wherein said hydrophilic layer is porous.

24. A layered membrane as in claim 23 wherein the average pore size of the hydrophilic layer is less than the average pore size of the hydrophobic layer.

25. A layered membrane as in claim 23 wherein the hydrophilic layer is a mixture of cellulose acetate and cellulose nitrate.

26. A layered membrane as in claim 23 wherein the hydrophilic layer is cellulose acetate.

27. A layered membrane as in claim 22 wherein the hydrophilic layer is polysulfone.

28. A layered membrane as in claim 22 wherein the mean pore diameter of the hydrophobic layer is less than 0.5 $\mu$m.

29. A layered membrane as in claim 22 wherein the mean pore diameter of the hydrophobic layer is within a range of about 0.25 $\mu$m to 0.5 $\mu$m.

30. A layered membrane as in claim 22 wherein the hydrophobic layer comprises substantially polytetralfluoro-ethylene.

31. A layered membrane as in claim 22 wherein said hydrophobic layer comprises substantially polyvinylidene fluoride.

32. A layered membrane as in claim 31 wherein said hydrophilic layer is non-porous.

* * * * *